United States Patent
Kamiya

(10) Patent No.: US 8,810,164 B2
(45) Date of Patent: Aug. 19, 2014

(54) VEHICLE DOOR OPENING/CLOSING CONTROL DEVICE

(75) Inventor: Haruo Kamiya, Atsugi (JP)

(73) Assignee: Mitsui Kinzoku Act Corporation (JP)

( * ) Notice: Subject to any disclaimer, the term of this patent is extended or adjusted under 35 U.S.C. 154(b) by 649 days.

(21) Appl. No.: 13/158,624

(22) Filed: Jun. 13, 2011

(65) Prior Publication Data

US 2011/0308162 A1 Dec. 22, 2011

(30) Foreign Application Priority Data

Jun. 16, 2010 (JP) ................................. 2010-137313

(51) Int. Cl.
*H02P 1/54* (2006.01)
*H02P 7/00* (2006.01)

(52) U.S. Cl.
CPC .................................... *H02P 7/0038* (2013.01)
USPC .................... 318/62; 318/53; 318/34; 318/59

(58) Field of Classification Search
CPC .............................. H02P 7/0038; B22C 15/20
USPC ........................................... 318/62, 59, 53–54
See application file for complete search history.

(56) References Cited

U.S. PATENT DOCUMENTS 5,350,986 A * 9/1994 Long et al. .................... 318/432
6,087,794 A * 7/2000 Kawanobe .................... 318/446

FOREIGN PATENT DOCUMENTS

JP 3656182 B 3/2005

* cited by examiner

*Primary Examiner* — David Luo
(74) *Attorney, Agent, or Firm* — Ostrolenk Faber LLP

(57) ABSTRACT

In a vehicle door, an opening/closing control device is provided. In the device, a controller is connected to an input current path connected to a vehicle battery. By a switching relay circuit, electricity is supplied from the vehicle battery to a closing motor or a release motor selectively. Between the switching relay circuit and the closing motor, a closing relay circuit is provided. If electricity is supplied to the closing motor, the closing relay circuit will be switched to ON where electricity is supplied to the closing motor or OFF where electricity is not supplied to the closing motor.

3 Claims, 4 Drawing Sheets

VEHICLE DOOR OPENING/CLOSING CONTROL DEVICE

BACKGROUND OF THE INVENTION

This invention relates to a vehicle door opening/closing control device for controlling a motor by which a vehicle door opens and closes.

A door latch unit of a vehicle door engages with a striker of a vehicle body to allow the vehicle door to be held in a fully-closed position. With operation of a predetermined switch, an electric release actuator is driven to disengage the door latch unit from the striker to enable the door to open. When the door is closed, the door latch unit slightly engages with the striker which provides a half-latch position. An electric closing unit coupled to the door latch unit is driven to actuate the door latch unit from a half-latch state to a full-latch state to cause the door to move from a half-open position to a fully-closed position.

As disclosed in JP3656182B2, a motor for a release actuator and a controller which controls a motor for a closing unit comprises a release relay circuit which turns on and off electricity supplied to the motor for the release actuator, and a closing relay circuit for turning on and off electricity supplied to the motor for the closing unit.

However, in an opening control device for a vehicle door, the controller requires an input current path in which the release relay circuit is disposed in parallel with the closing relay circuit to enable electricity from a vehicle battery to be supplied into the release relay circuit and the closing relay circuit separately, so that the circuitry structure becomes complicated.

SUMMARY OF THE INVENTION

In view of the disadvantages in the prior art, it is an object of the present invention to provide an opening/closing control device for a vehicle door, comprising a controller in which a circuitry structure is simplified.

DETAILED DESCRIPTION OF PREFERRED EMBODIMENT

One embodiment of the present invention will be described with respect to drawings.

Figure 1:
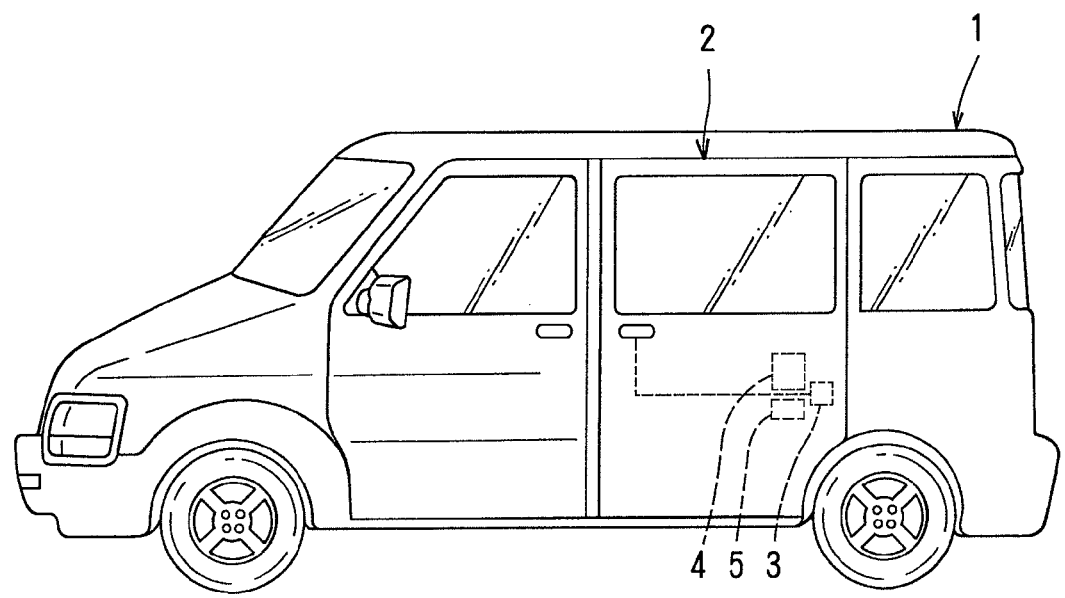
FIG. 1 is a side elevational view of a vehicle to which the present invention is applied.

In FIG. 1, numeral 1 denotes a vehicle body of a car of minivan- or station-wagon-type; 2 denotes a sliding door that opens and close on the side of the vehicle body 1; 3 denotes a door latch unit at the rear end inside the sliding door 2; 4 denotes an electric closing unit connected to the door latch device 3; and 5 denotes an electric release actuator connected to the door latch device 3. A motor 41 for a closing unit 4 and a motor 51 for a release actuator 5 are controlled by a controller 6 in the vehicle body as described later.

The present invention is not limited to the embodiment, and is applicable to a swinging side door or a tailgate which opens and closes vertically.

The vehicle body 1 and sliding door 2 are electrically connected to each other via a flexible electric wire to enable electricity from a battery 19 of the vehicle body 1 to be supplied to the sliding door 2 and to enable a detecting signal of each of the switches of the sliding door 2 to be transmitted to the controller 6.

The door latch unit 3 comprises a latch mechanism (not shown) that engages with a striker (not shown) fixed to the vehicle body to hold the sliding door 2 in a fully-closed position and a release mechanism (not shown) that releases engagement of the latch mechanism with the striker to enable the sliding door 2 to open.

The door latch device comprises a half-latch detecting switch 7 which is capable of detecting a half-latch state in which the latch mechanism slightly engages with the striker, corresponding to a half-open position of the sliding door 2, and a full-latch detecting switch 8 which is capable of detecting a full-latch state in which the latch mechanism completely engages with the striker, corresponding to a fully-closed position of the sliding door 2.

The closing unit 4 comprises a closing motor 41 and a mechanical transmission mechanism (not shown) which reduces rotation speed of the closing motor 41 to transmit it to the latch mechanism of the latch unit 3. When the sliding door 2 closes, the half-latch detecting switch 7 detects the half-latch state of the latch mechanism, the closing motor 41 rotates in a normal direction to move the latch mechanism from the half-latch state to the full-latch state to move the sliding door 2 from the half-open position to the fully-closed position. When the full-latch detecting switch detects the full-latch state of the latch mechanism, the closing motor reverses to return to the initial state before operation.

The release actuator 5 comprises a release motor 51 and a transmission mechanism (not shown) that reduces rotation speed of the release motor 51 to transmit it to the release mechanism of the door latch unit 3. By opening a switch 6, the release motor 51 is driven to release the release mechanism to disengage the latch mechanism from the striker to enable the sliding door 2 to open. When the release actuator 5 operates to release the latch mechanism from the striker, the closing unit 4 is disconnected from the latch mechanism of the door latch unit 3 to cause the latch mechanism to operate freely.

As shown in FIGS. 2 to 5, the controller 6 comprises a control 10 which mainly comprises a microcomputer; relay drive circuits 11,12,13 controlled by the control 19; a switching relay circuit 14 changed by controlling the relay drive circuits 11,12,13; closing relay circuits 16,17; a switching relay circuit 15; and a current detecting circuit 18 which enables electric current to be detected owing to potential difference before and behind a resistor 21. To input ports of the controller 6, each signal is supplied from the half-latch detecting switch 7, full-latch detecting switch 8 and switch 9 which operates to open the sliding door 2, and the closing motor 41 and release motor 51 are electrically connected to output ports.

A drive control command is supplied to the relay drive circuits 11,13 by the control 10 to which the signal is given from the switch 9. A normal rotation drive control command is supplied to the relay drive circuit 12 by the control 10 to which a half-latch signal is given from the half-latch detecting switch 7. A reverse rotation drive control command is supplied to the relay drive circuit 12 by the control to which a full-latch signal is given from the full-latch detecting switch 8.

The switching relay circuit 14 is connected via an input path 65 to an input terminal 61 which is connected to a power source line 20 of the vehicle battery 19. On the basis of the control of the relay drive circuit 11, the switching relay circuit 14 can be changed from the first state in FIGS. 2,4,5 in which a moving contact 141 is in contact with a fixed contact 142 of a current path 62 where electricity of the vehicle battery 19 is supplied to the closing motor 41 via the closing relay circuits 16,17, to the second state in FIG. 3 in which a moving contact 141 is in contact with a fixed contact 142 of a current path 63 via which electricity is supplied to the release motor 51. Without command from the relay drive circuit 11, the moving contact 141 is kept in contact with the fixed contact 142.

The closing relay circuits 16,17 are disposed next to the switching relay circuit 14.

A fixed contact 163 of the closing relay circuit 16 is connected to the current path 62, and the other fixed contact 172 is connected to a current path 64 which is connected to a fixed terminal of the switching relay circuit 15. A moving contact 171 is connected to the other terminal of the closing motor 41. A moving contact 161 is connected to one terminal of the closing motor 41. On the basis of normal rotation control of the relay drive circuit 12, the moving contact 161 changes from an OFF state in FIGS. 2,3,5 in which the moving contact 161 is in contact with the fixed contact 162 of the current path 64 to an ON state in FIG. 4 in which the moving contact 161 is in contact with a fixed contact 163 of the current path 62. Without command from the relay drive circuit 12, the moving contact 161 is kept in contact with the fixed contact 162.

A fixed contact 173 of the closing relay circuit 17 is connected to the current path 62, and a fixed contact 172 is connected to the current path 64 which is connected to the fixed terminal 151 of the switching relay circuit 15. A moving contact 171 is connected to the other terminal of the closing motor 41. On the basis of reverse rotation control, the moving contact 71 changes from an OFF state in FIGS. 2-4 in which the moving contact is in contact with the fixed contact 173 connected to the current path 62 to an ON state in FIG. 5 in which the moving contact 171 is in contact with the fixed contact 173 connected to the current path 62. Without commands from the relay drive circuit 12, the moving contact 171 is kept in contact with the fixed contact 172.

The closing motor 41 is connected at one terminal to the closing relay circuit 16 and at the other terminal to the closing relay circuit 17 respectively. While the closing relay circuit 17 remains OFF, the closing relay circuit 16 changes to ON to allow the closing motor 41 to rotate normally, thereby carrying out closing action of the latch mechanism of the door latch unit 3. While the closing relay circuit 16 remains OFF, the closing relay circuit 17 changes to ON to return the closing mechanism to the initial condition with reverse rotation.

The release motor 51 is connected at one terminal to the current path 63 or the fixed contact 143 of the switching relay circuit 14 and at the other terminal to the fixed contact 152 of the switching relay circuit 15.

In the switching relay circuit 15, a fixed contact 151 is coupled to the rear end of the current path 64, and a fixed contact 152 is coupled to the other terminal of the release motor 51. On the basis of the control of the relay drive circuit 13, a moving contact 153 is changeable from the first state in FIGS. 2,4,5 in which the moving contact 153 is in contact with the fixed contact 151, to the second state in FIG. 3 in which the moving contact 153 is in contact with a fixed contact 152. Without a command from the relay drive circuit 13, the moving contact 153 is kept in contact with the fixed contact 151.

Electric current that passes through the switching relay circuit 15 is detected by an electric current detecting circuit 18 on the basis of potential difference before and behind the resistor 21.

Figure 2:
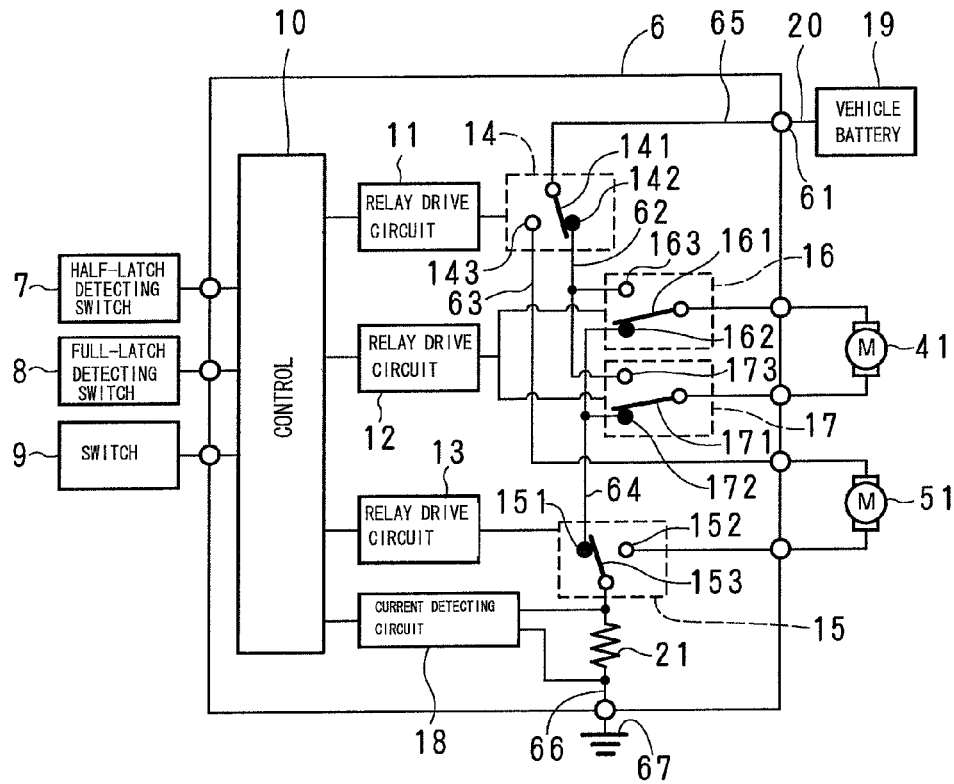
FIG. 2 is a circuit block diagram of a controller in the present invention.

In a rest state in FIG. 2 where none of a half-latch signal from the half-latch detecting switch 7, a full-latch signal from the full-latch detecting switch 8 and a signal from the switch 9 is supplied, the switching relay circuits 14,15 and closing relay circuits 16,17 are kept in the first state and OFF respectively. In the state, electricity is not supplied to the closing motor 41 or release motor 51.

Then, drive timing of the relay circuits 14-17 and the motors 41,51 and electricity flow supplied from the vehicle battery 19 will be described. Drive timing is controlled by the control 10.

Opening the Sliding Door 2

Figure 3:
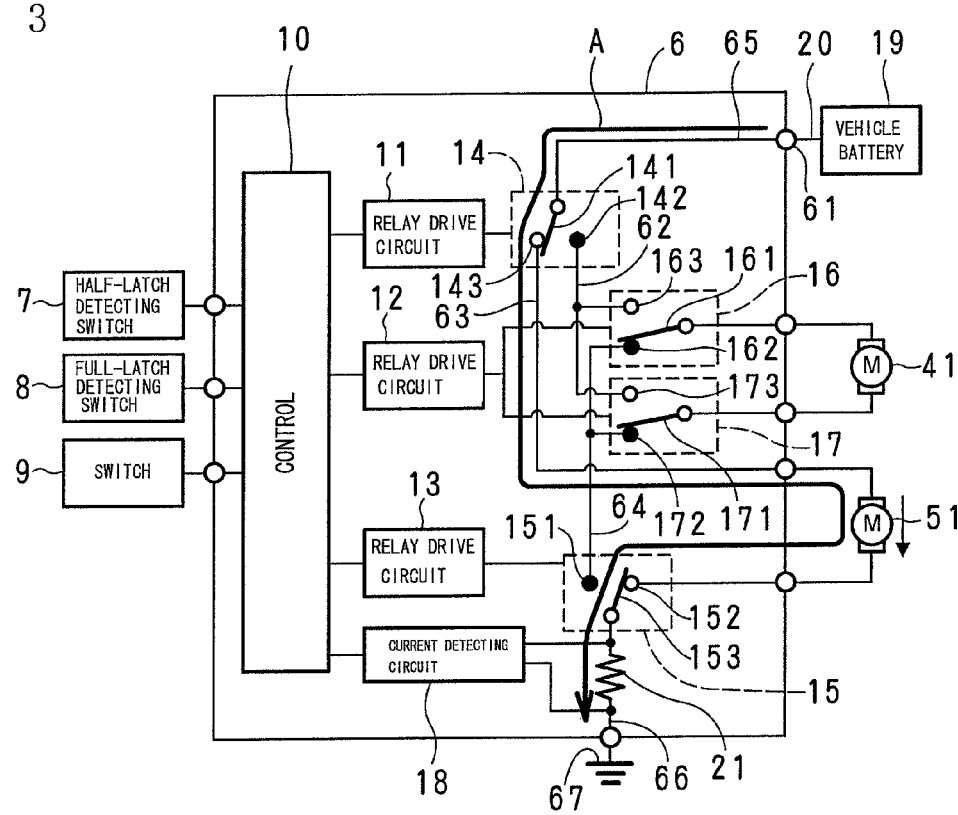
FIG. 3 is a circuit block diagram of the controller when a release motor is driven.
Figure 6:
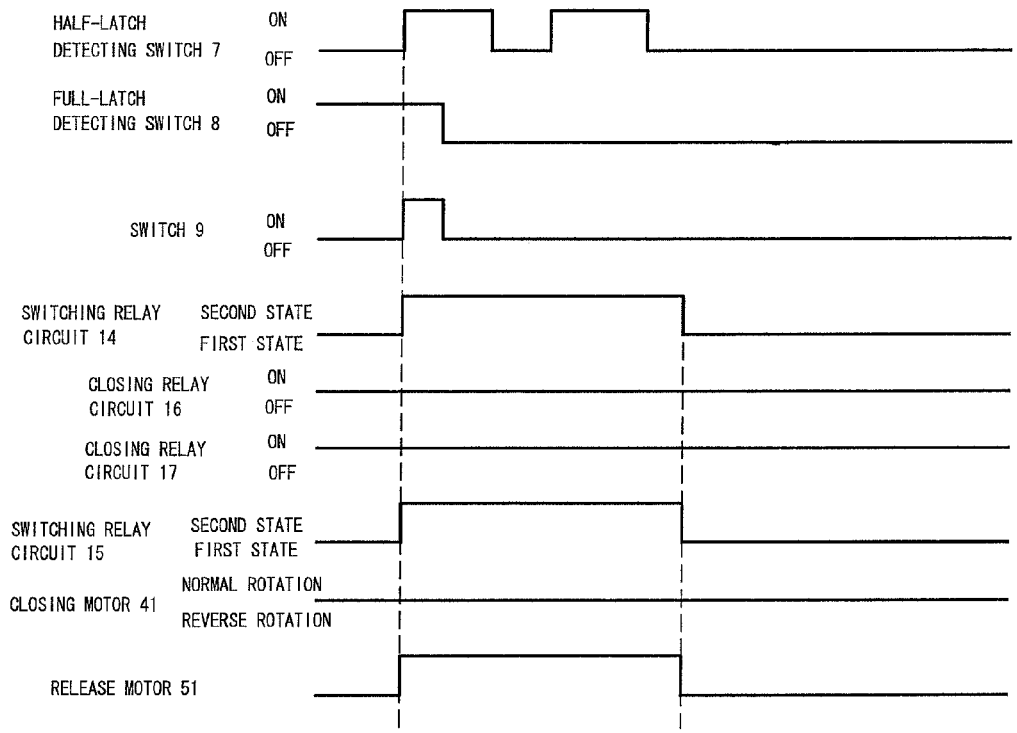
FIG. 6 is a timing chart when the release motor is driven so that the operation of the present invention is described.

When the sliding door 2 is closed, an operating signal is supplied from the switch 9 to the controller 6. As shown in a timing chart of FIG. 6, the switching relay circuits 14,15 changes from the first state to the second state and are held in the second state for a while. As shown in FIG. 3, electricity is supplied from the vehicle battery 19 to the release motor 51 via the power source line 20, the input current path 65, the switching relay circuit 14 and the current path 63 as shown by an arrow A. Electric current which passes through the release motor 51 flows to a vehicle earth 67 via the switching relay circuit 15 and the earth current path 66.

The release motor 51 rotates to actuate the release mechanism of the door latch unit 3 thereby releasing the latch mechanism from the striker to enable the sliding door 2 to open. After certain time passes, the switching relay circuit 14 and the switching relay circuit 15 change from the second state to the first state to stop power supply to the release motor 51.

Closing the Sliding Door 2

Figure 4:
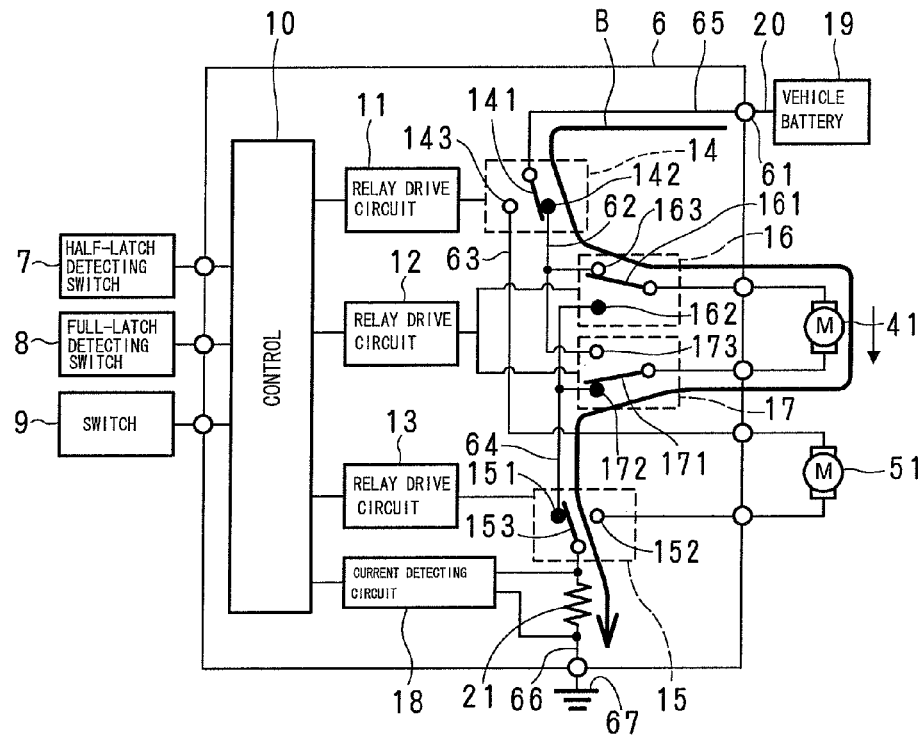
FIG. 4 is a circuit block diagram of the controller when a closing motor normally rotates.
Figure 5:
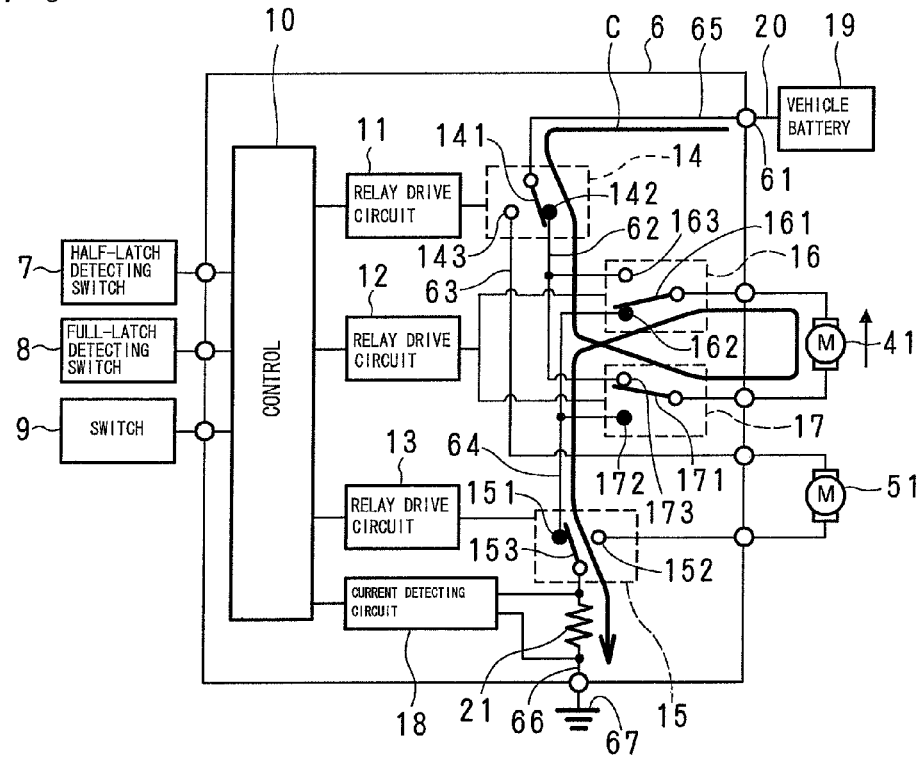
FIG. 5 is a circuit block diagram of the controller when the closing motor reversely rotates.
Figure 7:
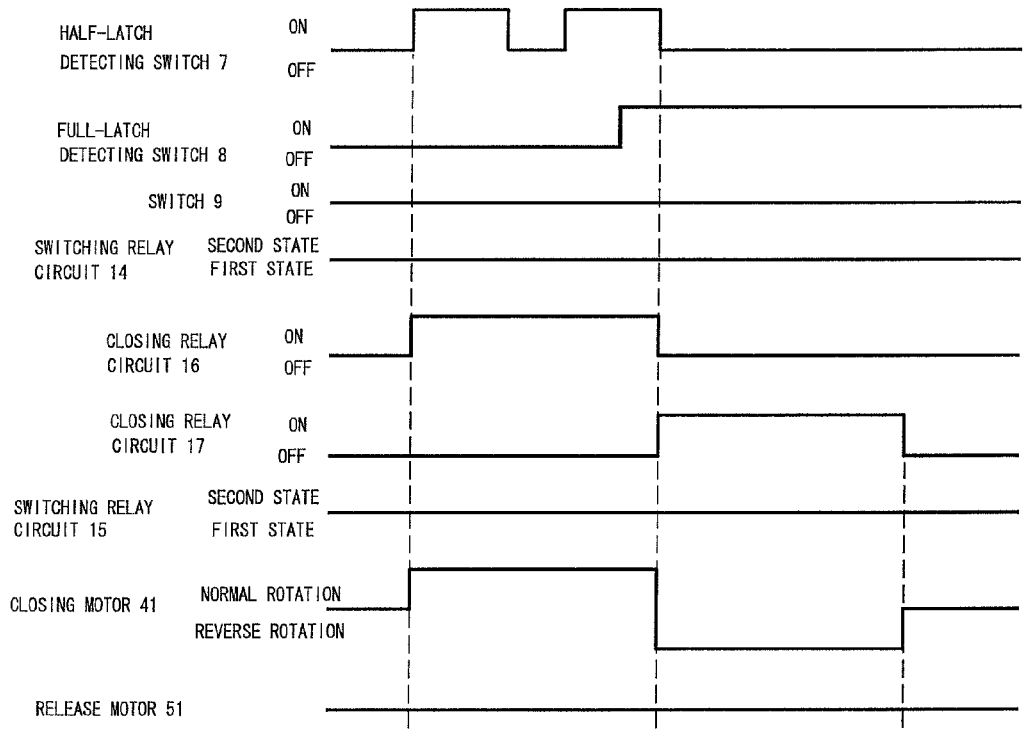
FIG. 7 is a timing chart when the closing motor is driven so that the operation of the present invention is described.

When the sliding door 2 closes, the half-latch detecting switch 7 becomes ON to allow a half-latch signal to be supplied into the controller 6. As shown in a timing chart of FIG. 7, the closing relay circuit 16 changes from OFF to ON and is held as ON for a while. Thus. as shown in FIG. 4, electricity from the vehicle battery 19 is supplied to the closing motor 41 via the power source line 20, input current path 65, switching relay circuit 14, current path 62 and closing relay circuit 16 as shown by an arrow B in FIG. 4. Electric current which passes through the closing motor 41 flows into a vehicle earth 67 via the closing relay circuit 17, switching relay circuit 15 and earth current path 66.

The closing motor 41 rotates normally to move the latch mechanism of the door latch unit from the half-latch state to the full-latch state, causing the sliding door 2 from the half-open position to the fully-closed position.

The sliding door 2 moves to the fully-closed position and the full-latch detecting switch 8 becomes ON to allow a full-latch signal to be supplied into the controller 6. Then, the closing relay circuit 16 returns to OFF. The closing relay circuit 17 changes to ON and is kept as ON for a while. As shown by an arrow C in FIG. 5, electricity from the vehicle battery 19 is supplied to the closing motor 41 via the power source line 20, input current path 65, switching relay circuit 14, current path 62 and closing relay circuit 17. Electric current which flows through the closing motor 41 flows to the vehicle earth 67 via the closing relay circuit 16, switching relay circuit 15 and earth current path 66. Thus, the closing motor 41 reverses, so that the closing unit 4 returns to the initial condition before operation.

Preventing Catching

During normal rotation of the closing motor 41 or while the sliding door 2 moves from the half-closed position to the fully-closed position, if something is likely caught between the sliding door 2 and the vehicle body 1, the switching relay circuit 14,15 changes from the first state to the second state with the switch 9, and electricity is supplied into the release motor 51. Electricity is not supplied to the closing motor 41. The release mechanism operates for releasing with drive of the release motor 51 to disengage the latch mechanism from the striker. The closing unit 4 is mechanically disconnected from the latch mechanism to allow the sliding door 2 to open immediately thereby preventing something from being caught between the sliding door 2 and the vehicle body 1. After the sliding door 2 opens, the switching relay circuits 14,15 returns to the first state, and the closing relay circuit 17 changes to ON, so that the closing unit 4 returns to the initial condition.

Detecting Malfunction of the Relay Circuit

If electric current is detected by the electric current detecting circuit 18 owing to potential difference before and behind the resistor 21 through the switching relay circuit 15 in the first state although a drive control command from the control 10 is not supplied to the relay drive circuit 12, it is judged by the controller 6 that malfunction occurs in the closing relay circuits 16,17, and control is carried out by the controller 6 to prohibit the operation of the closing motor 41. If electric current which passes through the switching relay circuit 15 in the first state is detected by the electric current detecting circuit 18 although a drive control command is not supplied by the control 10 to the relay drive circuit 11, it is determined that malfunction occurs in the switching relay circuit 14, and the controller 6 prohibits the operation of the release motor 51.

In this embodiment, the switching relay circuit 14 makes it possible to switch power supply to the release motor 51 and closing motor 41. Thus, the input current path 65 can be used not only for supplying electricity to the closing motor 41 but also to the release motor 51. The earth current path 66 is common to the closing motor 41 and to the release motor 51 thereby simplifying the circuitry structure in the controller 6.

The foregoing merely relates to an embodiment of the invention. Various changes and modifications may be made by those skilled to the art without departing from the scope of claims wherein:

What is claimed is:

1. An opening/closing control device in a vehicle door, comprising:
    a closing motor switching a door latch in the vehicle door from a half-latch state to a full-latch state;
    a release motor releasing the door latch with a switch; and
    a controller that controls the closing motor and the release motor, the controller comprising a switching relay circuit connected to an input current path connected to a vehicle battery, the switching relay circuit switching between a first state where electricity of the vehicle battery is supplied to the closing motor and a second state where electricity is supplied to the release motor, the controller further comprising a closing relay circuit provided between the switching relay circuit and the closing motor to change between an ON state which electricity is supplied to the closing motor and an OFF state where electricity is shut off when the switching relay circuit is in the first state, electricity being supplied to the closing motor by switching the closing relay circuit from the OFF state to the ON state by a half-latch signal from the door latch while the switching relay circuit still remains in the first state, electricity being supplied to the release motor by changing the switching relay circuit from the first state to the second state with the switch.

2. The device of claim 1 wherein the controller further comprises an additional switching relay circuit switching between a third state where electric current which flows through the closing motor is sent to a vehicle earth and a fourth state where electric current which flows through the release motor is sent to the vehicle earth, the additional switching relay circuit being changed from the third state to the fourth state with the switch.

3. The device of claim 2 wherein the controller comprises an electric current detecting circuit which detects electric current by potential difference before and behind a resistor provided next to the additional switching relay circuit.

* * * * *